United States Patent
Zaifman et al.

(10) Patent No.: US 6,292,826 B1
(45) Date of Patent: Sep. 18, 2001

(54) SHADOW ARRAYS FOR DISTRIBUTED MEMORY MULTIPROCESSOR ARCHITECTURE

(75) Inventors: Arthur L. Zaifman, Marblehead, MA (US); Stephen Ciavaglia, Merrimack, NH (US); Edward C. Szajner, Jr., Leominster, MA (US)

(73) Assignee: Alcatel Internetworking, Inc., Calabasas, CA (US)

( * ) Notice: Subject to any disclaimer, the term of this patent is extended or adjusted under 35 U.S.C. 154(b) by 0 days.

(21) Appl. No.: 09/161,875

(22) Filed: Sep. 28, 1998

(51) Int. Cl.[7] .................................................. G06F 15/167
(52) U.S. Cl. ............................ 709/213; 711/147; 712/31
(58) Field of Search .................................. 711/152, 147; 713/500, 1; 707/10; 712/29, 16, 31; 709/213, 239, 208

(56) References Cited

U.S. PATENT DOCUMENTS

| | | | |
|---|---|---|---|
| 4,862,350 | * | 8/1989 | Orr et al. .............................. 709/213 |
| 5,093,913 | * | 3/1992 | Bishop et al. ........................ 711/152 |
| 5,613,071 | * | 3/1997 | Rankin et al. ........................ 707/10 |
| 5,752,068 | * | 5/1998 | Gilbert .................................. 712/16 |
| 5,828,894 | * | 10/1998 | Wilkinson et al. .................... 712/20 |
| 5,864,738 | * | 1/1999 | Kessler et al. ....................... 709/239 |
| 5,913,227 | * | 6/1999 | Raz et al. ............................ 711/152 |
| 5,968,150 | * | 10/1999 | Kametani ............................. 710/100 |
| 6,073,247 | * | 6/2000 | Boutet et al. ........................ 713/500 |

\* cited by examiner

*Primary Examiner*—Zarni Maung
*Assistant Examiner*—Jungwon Chang
(74) *Attorney, Agent, or Firm*—Christie, Parker & Hale, LLP

(57) ABSTRACT

Shadow arrays are configured in a distributed memory multiprocessor architecture to localize memory referencing. As each additional processor becomes active a variable array having dimensions 1×N, including N single instance variables which must be monitored on a "per processor" basis, is configured in a memory local to the additional processor and made locally referenceable. A patchwork of shadow arrays is thereby established in which each additional processor may reference local memory to access its own value set for the N single instance variables. The single instance formatting of the arrays also advantageously facilitates migration from an single processor operating system to a multiprocessor operating system without substantial recoding.

20 Claims, 4 Drawing Sheets

SHADOW ARRAYS FOR DISTRIBUTED MEMORY MULTIPROCESSOR ARCHITECTURE

BACKGROUND OF THE INVENTION

The present invention relates to distributed memory multiprocessor architectures and, more particularly, to methods and devices for improving coding and memory referencing efficiency in distributed memory multiprocessor architectures.

Time critical data processing functions are often performed in multiprocessor architectures. Multiprocessor architectures provide superior processing speeds relative to single processor architectures by executing multiple operating system tasks concurrently. Concurrently-executing tasks, however, generally create the need to track some variables on a "per processor" basis. For example, when different processors are running different tasks concurrently, it is often necessary to simultaneously monitor which task is currently being performed by each processor. Contemporaneous monitoring has conventionally been achieved by declaring in the operating system a global variable array having the form x[NCPU−1], wherein NCPU is the number of processors supported in the multiprocessor architecture and each processor is assigned a different integer in the range zero to NCPU−1 for tracking its instance of x.

The use of global variable arrays in the form x[NCPU−1] has created complications. First, in distributed memory multiprocessor architectures, standard compilers usually assign all NCPU instances of x to contiguous addresses in a single processor's local memory. While the other processors can access their respective instances of x by referencing the remote processor's memory, the latency associated with such non-local memory referencing is often considerable. To retrieve data from a non-local memory, routing assistance of a global memory controller (GMC) shared among the processors is usually required. Such assistance typically involves resolving a global physical address (GPA) supplied by the referencing processor to the non-local memory supporting that address and routing the address accordingly. Because the GMC is a shared resource, routing assistance is often delayed while addresses previously submitted are resolved and routed. Additional time is spent routing the address once access to the GMC is secured.

A second complication arises if the multiprocessor operating system is derived from a single processor operating system. It is often the case that an operating system for a multiprocessor architecture is derived from an operating system originally designed for a single processor architecture. In that event, each single instance coded variable in the form x which will require "per processor" monitoring in the multiprocessor architecture must be recoded into the form x[NCPU−1]. Such recoding may consume considerable programming man-hours.

Accordingly, there is a need for greater localization of memory referencing in distributed memory multiprocessor architectures, particularly for variables requiring tracking on a "per processor" basis. There is also a need for a means for adapting single processor operating systems into multiprocessor operating systems without substantial recoding.

SUMMARY Of THE INVENTION

In its most basic feature, the present invention addresses the shortcomings of global variable arrays in distributed memory multiprocessor architectures through the configuration of distributed "shadow" variable arrays. An array having dimensions 1×N is declared in operating system source code for a distributed memory multiprocessor architecture. The declared array includes N single instance variables which must be known on a "per processor" basis. When an initial processor becomes active, the declared array is configured in a memory local to the initial processor. As each additional processor becomes active, a shadow array comprising the same single instance variables and format is configured in a memory local to the additional processor and made locally referenceable. A patchwork of shadow arrays is thereby established in which each processor may reference local memory to access its own value set for the N single instance variables in the array. Greater localization of memory referencing in a distributed memory multiprocessor architecture is achieved. The single instance variable format of the arrays also advantageously facilitates migration from an existing single processor operating system to a multiprocessor operating system without substantial recoding.

These and other aspects of the present invention may be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1A:
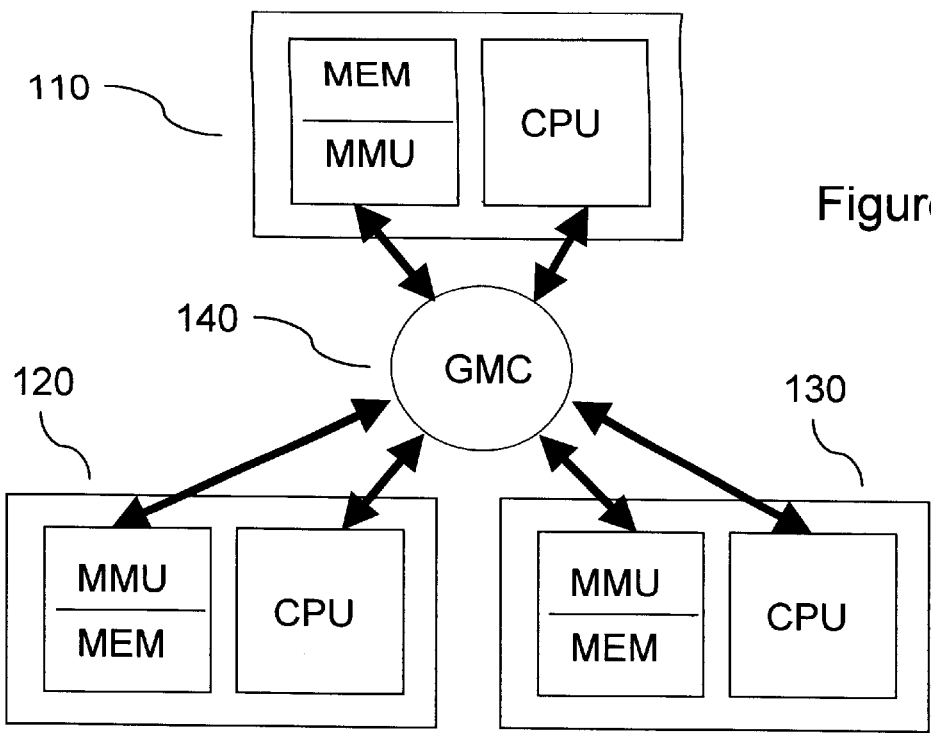
FIG. 1A illustrates a distributed memory multiprocessor architecture operative in accordance with the present invention.

In FIG. 1A, a distributed memory multiprocessor architecture in which the present invention is operative is shown. The architecture includes a plurality of processing elements 110, 120, 130 and a global memory controller (GMC) 140. Processing elements 110, 120, 130 have processors (CPUs), memories (MEMs) and memory management units (MMUs). Processors run an operating system adapted for a distributed memory multiprocessor architecture. Memories retain data for variables defined in the operating system. Processors reference variables residing in non-local memories with routing assistance from GMC 140 and translation assistance from non-local MMUs. Naturally, memory referencing includes "write" operations in which data are received in memory and "read" operations in which data are retrieved from memory. In an exemplary non-local memory reference operation, a processing element submits a global physical address (GPA) assigned to a variable to controller 140 for routing. Controller 140 routes the GPA to the non-local processing element supporting the GPA. The non-local processing element's MMU translates the routed GPA to a local physical address (LPA) and the relevant memory location is accessed. Although FIG. 1A illustrates three processing elements 110, 120, 130, the number of processing elements may differ in other embodiments and the number of active processing elements in a given architecture will vary with time as processors are activated and deactivated. CPUs run the operating system in object code form to implement described functionality. MMUs and GMC preferably have custom (i.e., hard-wired) logic for implementing described functionality. Global-to-local translation and routing may be implemented in a combination of custom logic and RAM or content addressable memory (CAM), or by other means known in the art, while dynamic random access memory (DRAM) is contemplated for MEMs.

Figure 1B:
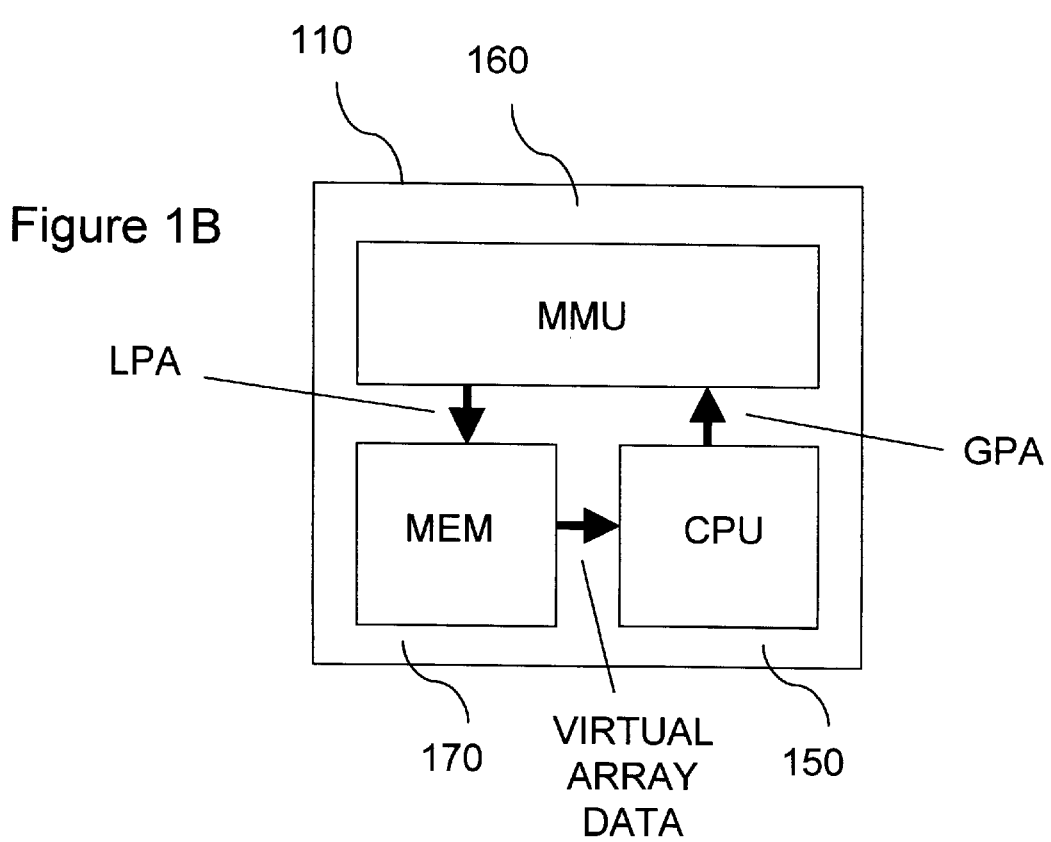
FIG. 1B illustrates a local referencing flow within a representative processing element operative in the distributed memory multiprocessor architecture of FIG. 1.

Turning now to FIG. 1B, a local referencing flow on a representative processing element 110 active within the architecture of FIG. 1A is shown. As illustrated by the arrows shown on FIG. 1B, processor 150 submits a GPA assigned to a variable to local MMU 160. Local MMU 160 translates the GPA to an LPA. The relevant location in local memory 170 is accessed using the LPA.

Figure 2:
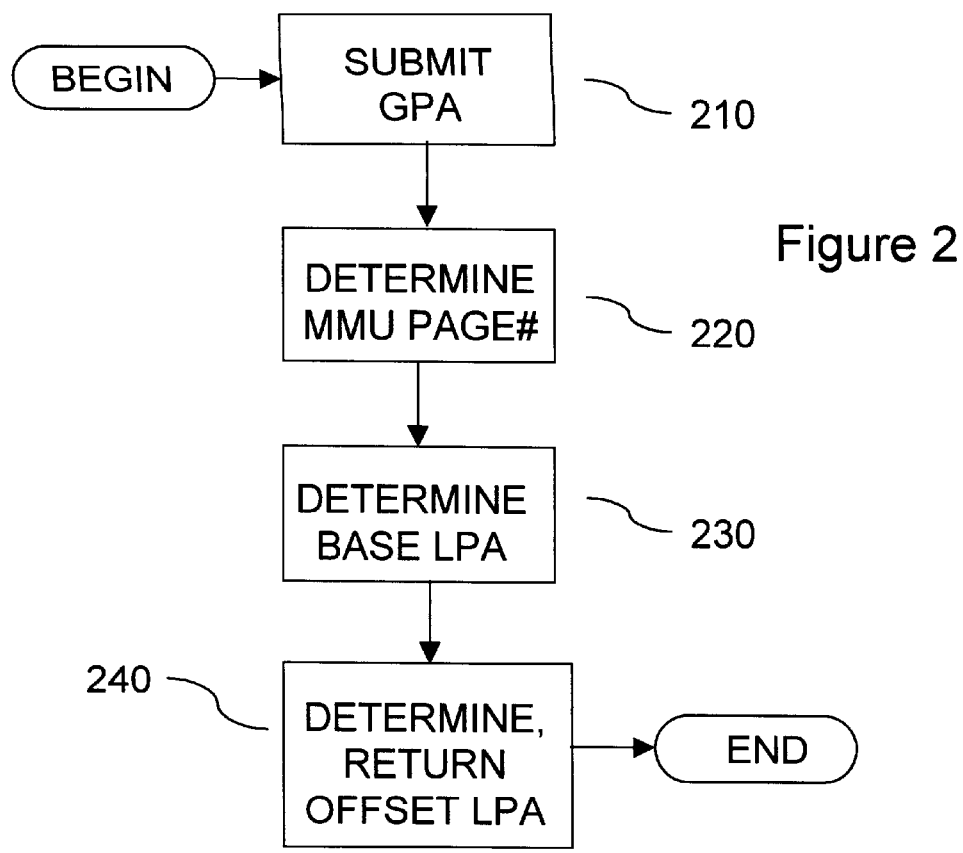
FIG. 2 is a flow diagram describing a global-to-local translation protocol in a memory management unit within the representative processing element of FIG. 2.

As indicated above, both local and non-local referencing require translation assistance. A preferred translation assistance protocol operative within the architecture of FIG. 1A is described in FIG. 2. A GPA is submitted to an MMU (210) and an MMU page number is calculated (220). The MMU page number is the value obtained by dividing the GPA by an MMU page size and subtracting any fractional remainder. A global-to-local table entry referenceable by MMU page number is consulted and a page-aligned LPA stored in association with the MMU page number is returned (230). The fractional remainder previously subtracted to obtain the MMU page number is added to the page-aligned LPA to resolve an offset LPA (240), which is the LPA corresponding to the submitted GPA. The offset LPA is used to reference the desired location in memory. Each MMU performs such global-to-local translations over the entire LPA range associated with the memory within the same processing element. By way of example, an MMU page size may be 4 KB and an MMU may resolve a GPA range of 00x0000000 to 0xC1FFFFFF to an LPA range of 0x0000000 to 0x1FFFFFFF. To avoid ambiguity in address resolution, every LPA is unique for a particular memory. It will be appreciated that substantial memory resources are conserved by retaining only page-aligned LPAs in the global-to-local translation table, as opposed to retaining the LPA corresponding to every GPA. The MMU page size is preferably the same for all MMUs operative within the architecture.

Figure 3:
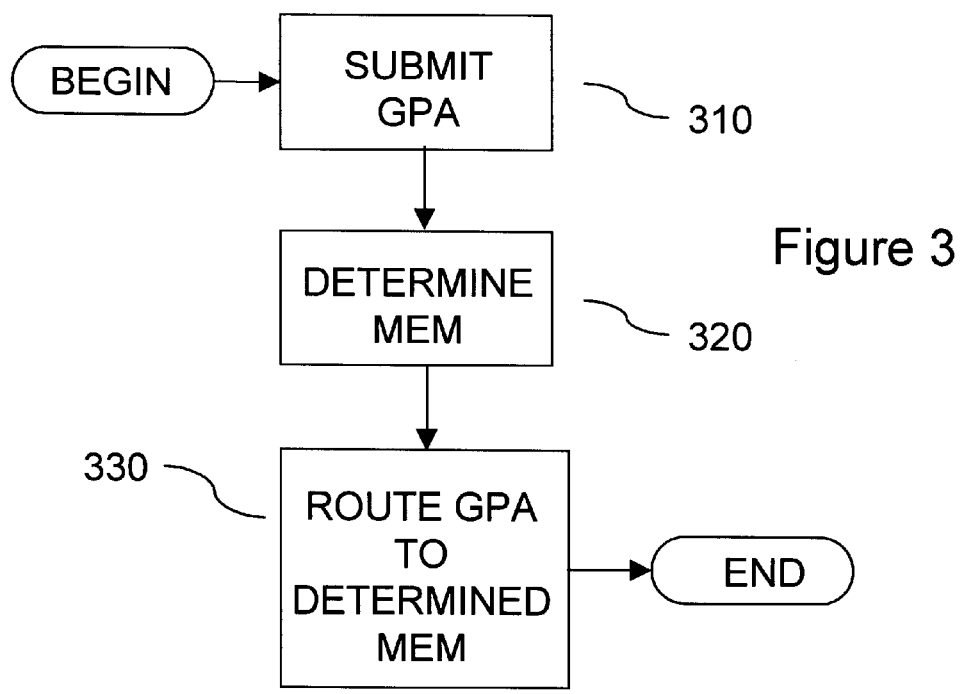
FIG. 3 is a flow diagram describing a GPA routing protocol in the global memory controller of FIG. 1.

As indicated above, non-local referencing requires routing assistance in addition to translation assistance. A preferred routing assistance protocol operative within the architecture of FIG. 1A is described in FIG. 3. A GPA assigned to a variable is submitted to controller 140 (310). Controller 140 resolves the GMA to a target memory (320) known to be associated with the GMA and routes the GPA to the target memory (330). For this purpose, controller 140 has a GPA-to-MEM mapping for the GPA ranges of all memories within the architecture. Controller 140 consults the mapping to resolve GPAs to their target memory and forwards GPAs to such target memories. To avoid ambiguity in target memory resolution, every GPA is unique for the architecture. By way of example, GPA ranges of 0xC0000000 to 0xC1FFFFFF, 0x40000000 to 0x4FFFFFFF and 0xC6000000 to 0xC7FFFFFF may be mapped to target memories associated with processing elements 110, 120 and 130, respectively.

Figure 5:
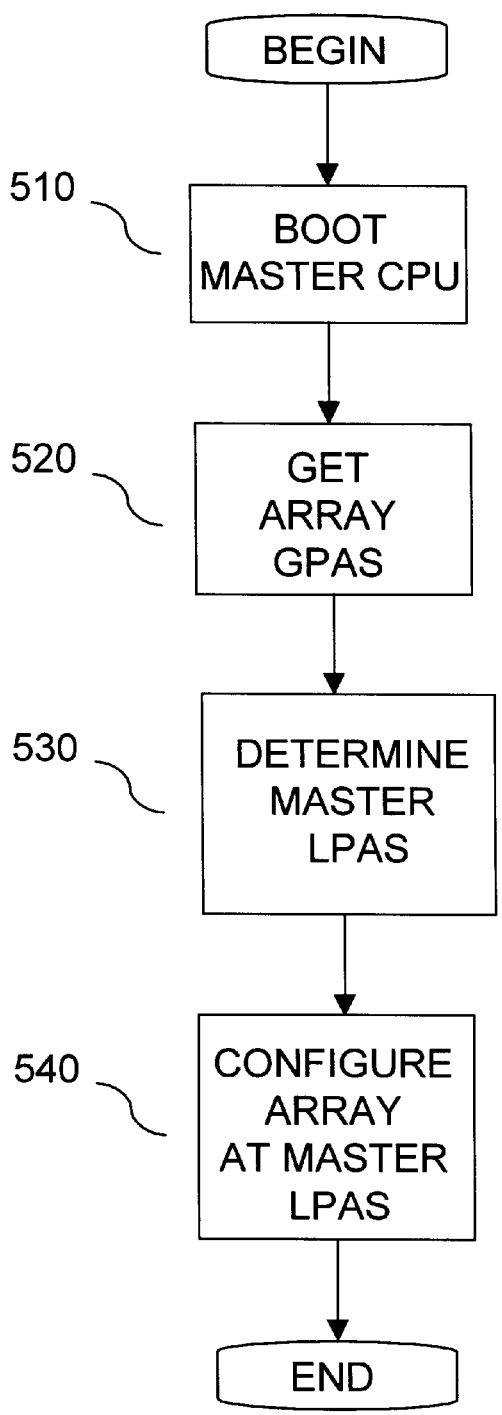
FIG. 5 is a flow diagram describing a declared array configuration protocol operative on a master processing element to configure a single instance variable array in the master processing element's local memory.
Figure 6:
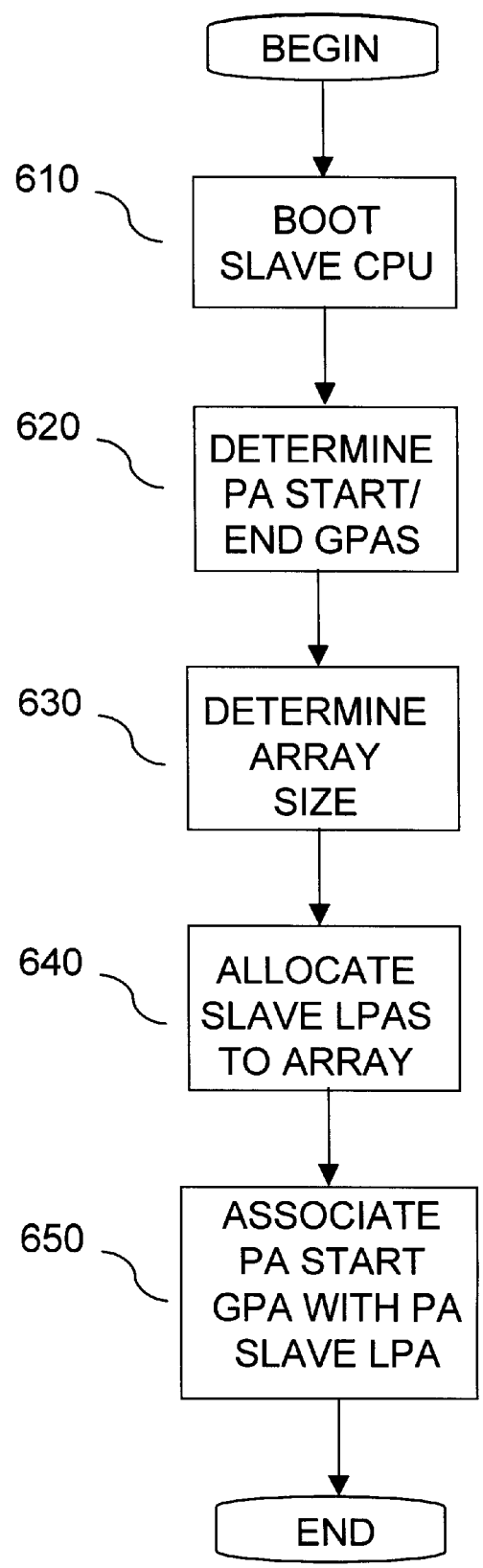
FIG. 6 is a flow diagram describing a shadow array configuration protocol operative between the master processing element and the slave processing element of FIG. 4 render a shadow array locally referenceable by the slave processing element.

It should be appreciated from the above description that non-local memory referencing will generally have a higher latency than local memory referencing. A primary objective of the present invention is to reduce latency by performing a greater number of references locally. This objective is met by configuring shadow variable arrays in a memory local to each processor and rendering such arrays locally referenceable by each processor. Each processor's shadow array retains the processor's value set for variables defined in the operating system which require monitoring on a "per processor" basis. The shadow array configuration flow and protocols through which the objective is achieved in a preferred embodiment is illustrated by reference to FIGS. 4 through 6.

The preferred shadow array configuration flow is conducted between a master processing element each slave processing element as the slave processing element is activated. The shadow array configuration flow between a master processing element 410 and a representative slave processing element 420 is isolated in FIG. 4. Operatively preceding any master-slave flow, however, is array declaration and declared array configuration on master processing element 410. In array declaration, a variable array having dimensions 1×N is declared in the source code for a distributed memory multiprocessor architecture operating system. The array includes N single instance variables which must be tracked in the architecture on a "per processor" basis. The variables are declared consecutively in the operating system source code and a one-MMU page pad is declared on each side of the array. The start and end pads are declared to ensure that after a page alignment operation all GPAs associated with the array and no GPAs associated with non-array variables will fall within page-aligned start and end GPAs. This is important for reasons which will become apparent. The declared array is linked and compiled by a standard compiler such that GPAs are assigned which correspond to contiguous address space in the master processing element's local memory 412 and are loaded into a symbol table in the operating system's image. One standard compiler which may be advantageously used is the GNU C compiler available from the Free Software Foundation. The GPA assigned to the first variable in the declared array preferably begins at an offset from a start GPA assigned randomly by the linker to the beginning of the start pad. By way of example, in the "C" programming language, a suitable 1×N array may be declared in the operating system source code as follows:

```
char        array_start [page size];
int         x;                  /* element 0 */
char        foo[1024];          /* element 1 */
struct bar  foobar;             /* element 2 */
...
struct bar  *foobar_ptr;        /* element N-1 */
char        array_end [page size];
``` wherein the linker would assign contiguous addresses in memory 412 to the variables array_start, x, foo, foobar, *foobar_ptr and array_end. Once linking and compiling has been completed, configuration of the declared array in the master processing element's local memory 412 is able to proceed upon boot-up of master processor 411, as described in FIG. 5. Upon boot-up (510), the operating system image is loaded on master processor 411 and a global-to-local translation table is loaded on MMU 413. The GPAs assigned to the declared array variables are retrieved from the operating system's symbol table (520) and are submitted to MMU 413. MMU 413 returns the counterpart LPAs in the master processor's local memory 412 (430). Array data in the form of the master processor's initial value set for variables which must be tracked on a "per processor" basis are written to memory 412 at the returned LPAs. Once initial array configuration has been completed as described master processor 411 submits the assigned GPAs to MMU 413 to locally reference its values for the array variables, as described in FIG. 2.

Figure 4:
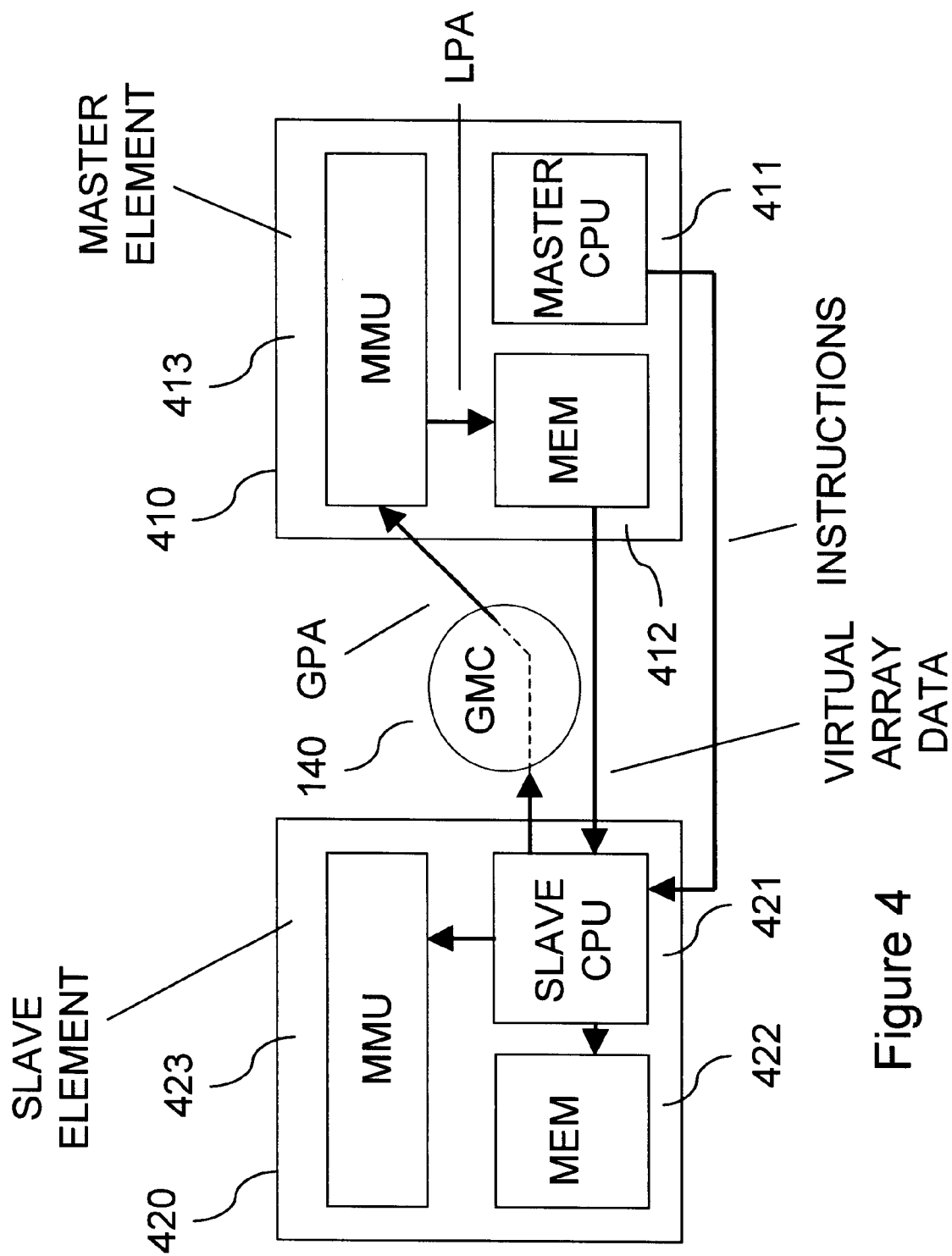
FIG. 4 illustrates a shadow array localization flow operative between a master processing element and a slave processing element to render a shadow array locally referenceable by the slave processing element.

The shadow array configuration flow shown in FIG. 4 is triggered whenever an additional processing element becomes active in the architecture. Additional processing elements are slaves to the master processing element in that additional elements rely on resources of the master element to configure local shadow arrays for retaining their respective "per processor" values for the single instance variables in the declared array. Shadow array configuration is achieved in a preferred embodiment as described in FIG. 6. Upon boot-up (610), slave processor 421 accesses the operating system image loaded on master processor 411. Page-aligned start and end GPAs are determined (620). The page-aligned start GPA is the start GPA assigned randomly by the linker (e.g., the GPA assigned to array_start) rounded up to the nearest MMU page boundary. The page-aligned end GPA is the assigned end GPA (e.g., the GPA assigned to array_end) rounded up to the nearest MMU page boundary. It will be appreciated that because of the one-page pad on either side of the array, all GPAs assigned to array variables will fall between the page-aligned start and end GPAs regardless of the proximity to the page boundary of the start GPA assigned randomly by the linker. Also, no GPAs assigned to non-array variables will fall within the page-aligned start and end GPAs. Using the page-aligned start and end GPAs, slave processor 421 calculates the number of MMU pages required to configure a shadow array in the slave processor's local memory 422 (630). A number of pages corresponding to the calculated array size is allocated in the slave processor's local memory 422 beginning at a randomly assigned page-aligned LPA (640). Once the pages have been allocated, slave processor 421 uses the page-aligned start GPA and array size to reference the master processor's local memory 412 via controller 140, with translation assistance from MMU 413, and copy the master processor's value set for the declared array to slave processor's local memory 422. Such values are the initial values for the slave processor's shadow array. Slave processor 421 configures the global-to-local translation table in MMU 423 to enable localized referencing of the configured shadow array (650). Particularly, the page-aligned start GPA is divided by the MMU page size to obtain a slave MMU page number. The slave MMU page number is stored in association with the assigned page-aligned LPA in the global-to-local translation table for MMU 423. Once configuration of the shadow array has been completed as described, slave processor 421 locally references its value set for "per processor" variables with translation assistance of MMU 423 as described in FIG. 2 using the GPAs assigned to the declared array as a referencing tool. Because after shadow array configuration there are both local and non-local LPAs assigned to particular GPAs, ambiguity is resolved by denying slave processor 421 further access to the range of pages in the master processor's local memory 422 at which the declared array is configured. Slave processor 421 always directs GPAs within the range of such pages for resolution to MMU 423. Since the declared array has start and end pads preventing non-array data from being stored on the same page as array data in master processor's local memory 422, denying slave processor 421 access to such pages advantageously does not render any non-array data inaccessible to slave processor 421.

The foregoing flows and protocols are repeated for each additional processor which becomes active in the architecture. As a consequence, each additional processor in the architecture is advantageously arranged to locally reference its own shadow array for its values of operating system variables which must be monitored on a "per processor" basis. Latency in memory referencing within the distributed memory multiprocessor architecture is thereby reduced considerably. Moreover, by adapting a 1×N dimensional array to a multiprocessor architecture through the foregoing flows and protocols, migration from an existing single processor operating system to a multiprocessor operating system is achieved without the time-consuming recoding of single instance variables into global variable arrays.

It will be appreciated by those of ordinary skill in the art that the invention can be embodied in other specific forms without departing from the spirit or essential character hereof. The present invention is therefore considered in all respects illustrative and not restrictive. The scope of the invention is indicated by the appended claims, and all changes that come within the meaning and range of equivalents thereof are intended to be embraced therein.

We claim:

1. A method for arranging per processor variables for local referencing in a distributed memory multiprocessor architecture, the architecture having a plurality of processing elements including a master processing element and one or more slave processing elements, each processing element including a processor and a memory having a local address range, the local address ranges each comprising a plurality of local addresses having corresponding global addresses in a global address range, the method comprising:

(a) acquiring on a slave processing element one or more global addresses previously assigned to an array comprising one or more single instance variables, the array previously configured at one or more local addresses on a master processing element;

(b) configuring the array at one or more local addresses on the slave processing element; and (c) associating on the slave processing element one or more of the assigned global addresses with one or more of the local addresses on the slave processing element at which the array is configured.

2. The method according to claim 1, wherein the configuration step comprises:

(i) calculating the size of the array; and (ii) allocating a quantity of local addresses on the slave processing element in relation to the calculated array size.

3. The method according to claim 1, wherein the local addresses in each memory at which the array is configured define a contiguous address space.

4. The method according to claim 1, wherein a start pad precedes the array.

5. The method according to claim 1, wherein an end pad follows the array.

6. The method according to claim 2, wherein the array size is calculated in multiple-address pages, wherein each page included in the calculation has at least one global address assigned to a single instance variable in the array.

7. A method for configuring per processor variables for local referencing in a distributed memory multiprocessor architecture, the architecture including a plurality of processing elements, each processing element including a processor and a memory having a local address range, the local address ranges each comprising a plurality of local addresses having corresponding global addresses in a global address range, the method comprising:

(a) assigning one or more global addresses to an array comprising one or more single instance variables;

(b) configuring the array at one or more local addresses on a first processing element;

(c) acquiring the assigned global addresses on a second processing element;

(d) configuring the array at one or more local addresses on the second processing element; and (e) associating on the second processing element one or more of the assigned global addresses with one or more of the local addresses on the second processing element at which the array is configured.

8. The method according to claim 7, wherein step (d) comprises:

(i) calculating the size of the array, and (ii) allocating a quantity of local addresses on the second processing element in relation to the calculated array size.

9. The method according to claim 7, wherein the local addresses in each memory at which the array is configured define a contiguous address space.

10. The method according to claim 7, wherein a start pad precedes the array.

11. The method according to claim 7, wherein an end pad follows the array.

12. The method according to claim 8, wherein the array size is calculated in multiple-address pages, wherein each page included in the calculation has at least one global address assigned to a single instance variable in the array.

13. A self-configuring distributed memory multiprocessor architecture adapted for local referencing of per processor variables, the architecture including a plurality of processing elements, each processing element including a processor and a memory having a local address range, the local address ranges each comprising a plurality of local addresses having corresponding global addresses in a global address range, comprising:

means for assigning global addresses to an array comprising a plurality of single instance variables;

means for configuring the array at local addresses on a first processing element;

means for acquiring the global addresses on a second processing element;

means for configuring the array at local addresses on the second processing element; and means for mapping on the second processing element one or more of the assigned global addresses to one or more of the local addresses on the second processing element at which the array is configured.

14. The architecture according to claim 13, wherein the means for configuring the array at local addresses on the second processing element comprises:

means for calculating the size of the array; and means for allocating a quantity of local addresses on the second processing element in relation to the calculated array size.

15. The architecture according to claim 14, wherein the local addresses in each memory at which the array is configured define a contiguous address space.

16. The architecture according to claim 14, wherein a start pad precedes the array.

17. The architecture according to claim 14, wherein an end pad follows the array.

18. The architecture according to claim 15, wherein the array size is calculated in multiple-address pages, wherein each page included in the calculation has at least one global address assigned to a single instance variable in the array.

19. A method for arranging per processor variables for local referencing in a distributed memory multiprocessor architecture, the architecture having a plurality of processing elements including a master processing element and one or more slave processing elements, each processing element including a processor and a memory having a local address range, the local address ranges each comprising a plurality of local addresses having corresponding global addresses in a global address range, the method comprising:

(a) acquiring on a slave processing element one or more global addresses previously assigned to a declared array comprising one or more single instance variables, the declared array previously configured at one or more local addresses on a master processing element;

(b) configuring a shadow array at one or more local addresses on the slave processing element, the shadow array having the same variable set and format as the declared array; and (c) associating on the slave processing element one or more of the assigned global addresses with one or more of the local addresses on the slave processing element at which the shadow array is configured.

20. The method according to claim 19, wherein the configuration step comprises:

(i) calculating the size of the declared array; and (ii) allocating a quantity of local addresses on the slave processing element in relation to the calculated array size.

* * * * *